United States Patent [19]

Eichenauer et al.

[11] Patent Number: 5,362,810
[45] Date of Patent: Nov. 8, 1994

[54] THERMOPLASTIC MOLDING COMPOSITIONS OF AROMATIC POLYETHER SULFONE AND HYDROGENATED NITRILE RUBBER

[75] Inventors: Herbert Eichenauer; Hartmuth Buding; Thomas Eckel, all of Dormagen; Karl-Heinz Ott, Leverkusen, all of Germany

[73] Assignee: Bayer Aktiengesellschaft, Leverkusen

[21] Appl. No.: 145,294

[22] Filed: Oct. 29, 1993

Related U.S. Application Data

[63] Continuation of Ser. No. 673,253, Mar. 20, 1991, abandoned, which is a continuation of Ser. No. 402,686, Sep. 5, 1989, abandoned.

[30] Foreign Application Priority Data

Sep. 15, 1988 [DE] Germany .............................. 3831373

[51] Int. Cl.$^5$ .......................... C08L 81/06; C08L 9/02
[52] U.S. Cl. ..................................... 525/150; 525/189
[58] Field of Search ................ 525/150, 189, 338, 906

[56] References Cited

U.S. PATENT DOCUMENTS

| | | | |
|---|---|---|---|
| 3,555,119 | 1/1971 | Ingulli | 525/906 |
| 3,636,140 | 1/1972 | Ingulli | 525/150 |
| 3,700,637 | 10/1972 | Finch | 525/339 |
| 3,985,829 | 10/1976 | Falk | 525/292 |
| 4,452,950 | 6/1984 | Wideman | 525/338 |
| 4,879,349 | 11/1989 | Hoxmeier | 525/338 |

OTHER PUBLICATIONS

Data Base WPIL, No. 87-233 039 Derwent Publicaitons Ltd., London, G.B. 1987.

*Primary Examiner*—David Buttner
*Attorney, Agent, or Firm*—Connolly and Hutz

[57] ABSTRACT

Thermoplastic molding compositions of A) 70 to 99.5% by weight of a thermoplastic aromatic polyether sulfone or mixtures of several thermoplastic polyether sulfones and B) 30 to 0.5% by weight of a hydrogenated nitrile rubber.

10 Claims, No Drawings

THERMOPLASTIC MOLDING COMPOSITIONS OF AROMATIC POLYETHER SULFONE AND HYDROGENATED NITRILE RUBBER

This application is a continuation of application Ser. No. 07/673,253 filed on Mar. 20, 1991, now abandoned, which is a continuation of application Ser. No. 07/402,686, filed Sep. 5, 1989, now abandoned.

Aromatic polyether sulfones are distinguished by very good heat resistance; their toughness and processability as thermoplastics are less satisfactory. The often described increase in toughness by addition of certain graft rubbers (DE-AS 1 994 171, DE-OS 3 601 419, DE-OS 3 601 420) generally produces little or no improvement in processabability, but in many cases a deterioration in weathering resistance.

It has been found that mixtures of thermoplastic aromatic polyether sulfones and hydrogenated nitrile rubbers show high toughness, good processability and high weathering resistance.

The present invention relates to thermoplastic molding compositions

A) 70 to 99.5% by weight and preferably 75 to 97.5% by weight of a thermoplastic aromatic polyether sulfone or mixtures of several thermoplastic polyether sulfones and B) 30 to 0.5% by weight and preferably 25 to 2.5% by weight of a hydrogenated nitrile rubber.

Aromatic polyether sulfones (A) in the context of the invention may be described as linear, thermoplastic polyarylene polyether polysulfones in which the arylene units are interrupted by ether and sulfone bonds. These resins are obtained by reaction of an alkali metal double salt of a dihydric phenol (bisphenol) with a benzoid compound containing two halogen atoms, either one or both compound(s) having the sulfone bond (—SO$_2$—) necessary for the incorporation of sulfone units in the polymer chain comprising arylene and ether units. The polyether sulfones and their production are known from the literature (cf. for example U.S. Pat. No. 3,264,536, GB-P 1,264,900, EP-A 0 038 028).

The polyether sulfone resin has a basic structure consisting of recurring units corresponding to formula (I)

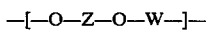   (I)

in which
Z is the residue of a dihydric phenol and
W is the residue of a benzoid compound containing an inert, electron-attracting group,
the two residues being attached to the ether oxygen atoms by aromatic carbon atoms via valency bonds and at least one of the residues Z and/or W containing a sulfone group between aromatic carbon atoms. These Polyether sulfones are among the polyarylene polyether resins described in U.S. Pat. No. 3,264,536.

Preferred diphenols for the production of the aromatic polyether sulfones (A) are compounds corresponding to formula (II)

HO—Z—OH   (II)

in which
Z is a difunctional, mono- or polynuclear aromatic radical containing from 6 to 30 carbon atoms,
the two OH groups each being directly attached to a carbon atom of an aromatic ring system.

Particularly preferred diphenols are compounds corresponding to formula (III)

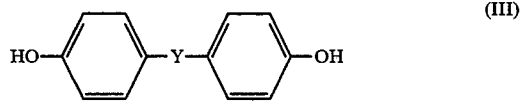   (III)

in which
Y is a single bond, an alkylene or alkylidene radical containing 1 to 7 carbon atoms, a cycloalkylene or cycloalkylidene radical containing 5 to 12 carbon atoms, —O—, —S—,

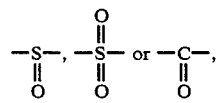

and nucleus-alkylated and nucleus-halogenated derivatives thereof, for example, hydroquinone, resorcinol, dihydroxy diphenyls, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl)-diisopropyl benzenes, and nucleus-alkylated and nucleus-halogenated derivatives thereof.

The most important diphenols are bisphenol A, tetramethyl bisphenol A; 1,1-bis-(4-hydroxyphenyl)-isobutane, 1,1-bis-(4-hydroxyphenyl)-cyclohexane; 4,4'-dihydroxydiphenyl sulfide; 4,4'-dihydroxydiphenyl sulfone and di- and tetrahalogenated, preferably chlorinated, derivatives thereof. Bisphenol A is particularly preferred. Mixtures of the diphenols mentioned may also be used.

Preferred aromatic dihalogen compounds are dinuclear compounds corresponding to formula (IV)

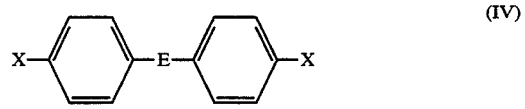   (IV)

in which X represents halogen, such as F, Cl, Br, I, and E represents electron-attracting groups, such as sulfone, carbonyl, vinyl, sulfoxide or azo groups. The two benzene nucleii may each additionally contain one or more residues of saturated hydrocarbons or electron-attracting compounds as substituents. Preferred dihalogen compounds are 4,4'-dichlorodiphenyl sulfone and 4,4'-dichlorobenzophenone.

The polyether sulfones (A) may also be branched in known manner by incorporation of polyfunctional monomers. Suitable branching agents are the known branching agents used for the production of aromatic polyesters and for the production of aromatic polyester carbonates (cf. in particular pages 9 and 10 of DE-OS 2 940 024 and page 9 of DE-OS 3 007 934).

The molecular weight of the polyether sulfones (A) may be regulated by chain terminators, i.e. by incorporation of monofunctional compounds.

Preferred chain terminators for the polyether sulfones (A) are phenol, alkyl phenols containing C$_{1-12}$ alkyl groups and halogenated phenols and also bromides and chlorides of C$_{1-10}$ alkanes, being used in quantities of from 0.1 to 10 mol-% (based on diphenols in the case of phenols and on the aromatic dihalogen compounds in the case of chlorides).

The reduced viscosities ($\eta_{red}$) of the aromatic polyether sulfones (A) are 0.15 to 1.5 dl/g and preferably 0.35 to 0.65 dl/g (as measured on solutions of 20 mg polyether sulfone (A) in 100 ml $CHCl_3$ at 25° C.).

Preferred hydrogenated nitrile rubbers (B) in the context of the invention are products obtained by hydrogenation of statistical copolymers of 90 to 45% by weight, preferably 85 to 50% by weight and more preferably 82 to 52% by weight of at least one conjugated diene, 10 to 55% by weight, preferably 15 to 50% by weight and more preferably 18 to 48% by weight of at least one unsaturated nitrile and 0 to 10% by weight and preferably 0 to 8% by weight of at least one other monomer copolymerizable with conjugated dienes and unsaturated nitriles.

Preferred conjugated dienes are 1,3-butadiene, 2-methyl-1,3-butadiene, 2,3-dimethyl-1,3-butadiene and 1,3-pentadiene, while preferred nitriles are acrylonitrile and methacrylonitrile.

Suitable other monomers are aromatic vinyl compounds, (meth)acrylates containing 1 to 12 carbon atoms in the alkyl component, $\alpha,\beta$-unsaturated mono- or dicarboxylic acids.

Examples of aromatic vinyl compounds are styrene, substituted styrenes, such as o-, m-, p-methyl styrene, ethyl styrene, vinyl naphthalene and vinyl pyridine; examples of the acrylates are methyl acrylate, ethyl acrylate, n-butyl acrylate, tert.-butyl acrylate, 2-(ethylhexyl acrylate, 2-hydroxypropyl acrylate; examples of methacrylates are methyl methacrylate, ethyl methacrylate, n-butyl methacrylate, t-butyl methacrylate, 2-ethylhexyl methacrylate, 2-hydroxypropyl methacrylate; examples of the unsaturated carboxylic acids are $\alpha,\beta$-unsaturated monocarboxylic acids containing 3 to 5 carbon atoms, such as acrylic acid, methacrylic acid and crotonic acid; $\alpha,\beta$-unsaturated dicarboxylic acids containing 4 to 5 carbon atoms, such as maleic, fumaric, citraconic end itaconic acid and also semiesters of the $\alpha,\beta$-unsaturated dicarboxylic acids, such as maleic acid n-dodecyl semiester or fumaric acid n-butyl semiester.

Suitable other copolymerizable compounds include vinyl chloride, vinylidene chloride, N-methylol acrylamide, vinyl alkyl ethers containing 1 to 4 carbon atoms in the alkyl group, vinyl esters of carboxylic acids containing 1 to 18 carbon atoms, such as vinyl acetate or vinyl stearate.

Special examples of copolymers to be hydrogenated are acrylonitrile/isoprene copolymers, acrylonitrile/isoprene/butadiene terpolymers, acrylonitrile/isoprene/n-butyl acrylate terpolymers, acrylonitrile/butadiene/methyl acrylate terpolymers, acrylonitrile/butadiene/n-butyl acrylate terpolymers, acrylonitrile/butadiene/2-hydroxypropyl methacrylate terpolymers, acrylonitrile/butadiene/methacrylic acid terpolymers. Acrylonitrile/butadiene copolymers are particularly preferred.

Processes for the hydrogenation of these products to form hydrogenated nitrile rubbers (with the nitrile groups intact) are known.

The degree of hydrogenation of the polymers (B) (percentage of the hydrogenated C—C— double bonds, based on the total number of C—C— double bonds originally present in the polymer) is determined by IR or NMR spectroscopy and amounts to at least 80%, preferably to at least 90% and, more preferably, to at least 95%.

The hydrogenated polymers (B) are gel-free and are soluble in ketones, such as acetone and butanone, in ethers, such as tetrahydrofuran or dioxane, or in chlorinated hydrocarbons, such as dichloromethane or chlorobenzene.

The molding compositions according to the invention may contain typical additives, such as for example lubricants and mold release agents, nucleating agents, stabilizers, fillers and reinforcing materials, flameproofing agents and also dyes. Thermoplastic resin components may also be added to the molding compounds according to the invention, including for example homopolymers or copolymers based on (substituted) styrene (for example styrene/acrylonitrile copolymers, $\alpha$-methyl styrene/acrylonitrile copolymers) or methyl methacrylate (for example polymethyl methacrylate), polyphenylene ethers based on 2,6-dimethyl phenol or mixtures thereof with high-impact polystyrene (HIPS), polycarbonates, for example based on bisphenol A, or graft rubbers, preferably based on saturated rubbers, such as for example ethylene/propylene (diene) rubber (EP(D)M rubber) polybutyl acrylate or polysiloxane rubber with, for example, styrene, $\alpha$-methyl styrene, nucleus-substituted styrene, methyl methacrylate, acrylonitrile, maleic anhydride, N-substituted maleic imide, vinyl acetate or mixtures thereof as monomers for forming the graft shell.

The molding compositions may be produced in standard mixing units, such as mixing rolls, kneaders, single-screw and multiple-screw extruders.

Although, in most cases, both components are best mixed in a single step, it may also be recommendable in some cases initially to leave out the second component and to add it at a later stage.

Thus, the molding compositions according to the invention may be produced in the mixing units mentioned above by melting components (A) and (B) together and homogenizing the resulting melt or by incorporating the hydrogenated nitrile rubber (B) in a melt of the polyether sulfone (A).

The temperature prevailing during production of the mixture should be at least 10° C. and best at most 80° C. above the melting point of the polyether sulfone.

The molding compounds according to the invention may be used for the production of moldings by injection molding and extrusion, particularly where the described properties are required, for example for exterior parts of motor vehicles.

EXAMPLES

Polymers Used

A)
Aromatic polyether sulfone 1141.7 parts bis-2,2-(4-hydroxyphenyl)-propane and 1435.8 parts bis-(4-chlorophenyl)-sulfone are dissolved under nitrogen in 4500 parts N-methyl pyrrolidone and 970 parts chlorobenzene and 760 parts anhydrous potassium carbonate are added to the resulting solution. The reaction mixture is heated for 30 minutes to 180° C. and left at that temperature for 5 hours, a mixture of water and chlorobenzene distilling off. The chlorobenzene is distilled off over a further 4 hours. After a reaction time of 6 hours, the reaction mixture is cooled to 60°–70° C., the polymer is precipitated in methanol, washed with water and dried in vacuo. The product has a reduced viscosity $\eta_{red}$ of 1.52 dl/g ($CHCl_3$ at 25° C.).

B)

Hydrogenated nitrile rubber obtained in accordance with Example 1 of DE-OS 3 329 974. A statistical acrylonitrile/butadiene copolymer containing 34.9% by weight acrylonitrile and having a Mooney viscosity ML 1+4/100° C. of 29 was used for hydrogenation. The degree of hydrogenation was 99.7% (as determined by infrared spectroscopy).

C)

Graft rubber obtained by radical polymerization of 36 parts by weight styrene and 14 parts by weight acrylonitrile in the presence of 50 parts by weight of a polybutadiene in the form of a latex having a mean particle diameter ($d_{50}$) of 400 nm.

The molding compounds according to the invention and comparison compounds were produced in an internal kneader.

Injection molding to test bars and platelets was carried out in an Arburg 350 injection molding machine at 250° C.

The test data were determined in accordance with the following standards:

| | |
|---|---|
| Notched impact strength $a_k$ (kJ/m$^2$): | DIN 53 453 |
| Softening point Vicat B (°C.): | DIN 53 460 |
| Flow MVI (cm$^3$/10 mins.): | DIN 53 735 |
| (as measured at 250° C./2.16 kg load) | |

Weathering resistance was visually evaluated from platelets after weathering in an Atlas Weather-O-Meter.

The compositions of the molding compounds are shown in Table 1 and the test data in Table 2.

TABLE 1

| | Composition of the molding compounds | | |
|---|---|---|---|
| Molding compound | A parts by weight | B parts by weight | C parts by weight |
| 1 | 97.5 | 2.5 | — |
| 2 | 95 | 5.0 | — |
| 3 | 90 | 10.0 | — |
| 4 (Comparison) | 100 | — | — |
| 5 (Comparison) | 97.5 | — | 2.5 |
| 6 (Comparison) | 90 | — | 10.0 |

TABLE 2

| | Test data of the molding compounds | | | | |
|---|---|---|---|---|---|
| Molding Compound | $a_k$RT | $a_k$ − 40° C. | Vicat B | MVI | Appearance after weathering |
| 1 | 7.1 | 2.3 | 169 | 1.2 | unchanged |
| 2 | 16.4 | 6.3 | 162 | 2.1 | unchanged |
| 3 | 24.1 | 9.0 | 157 | 2.8 | slightly matt |

TABLE 2-continued

| | Test data of the molding compounds | | | | |
|---|---|---|---|---|---|
| Molding Compound | $a_k$RT | $a_k$ − 40° C. | Vicat B | MVI | Appearance after weathering |
| 4 (Comparison) | 4.3 | 2.1 | 179 | 0.3 | not tested |
| 5 (Comparison) | 6.6 | 2.8 | 173 | 0.4 | slightly matt |
| 6 (Comparison) | 10.5 | 4.8 | 162 | 0.8 | matt |

We claim:

1. A thermoplastic molding composition consisting of:
    A) 70 to 99.5% by weight of a thermoplastic aromatic polyether sulfone or mixture of polyether sulfones; and
    B) 30 to 0.5% by weight of a hydrogenated nitrile rubber, which hydrogenated nitrile rubber is the product of at least 80% hydrogenation of the carbon to carbon double bonds of a statistical butadiene/acrylonitrile copolymer and;
    C. optionally one or more additives selected from lubricants, mold release agents, nucleating agents, stabilizers, fillers, reinforcing agents, flameproofing agents, and dyes.

2. The thermoplastic molding composition of claim 1, comprising 75 to 97.5% by weight of A) and 25 to 2.5% by weight of B).

3. The thermoplastic molding composition of claim 2, comprising 90 to 97.5% by weight of A) and 2.5 to 10% by weight of B).

4. The thermoplastic molding composition of claim 1, wherein the statistical butadiene/acrylonitrile copolymer contains 90 to 45% by weight butadiene and 10 to 55% by weight of acrylonitrile.

5. The thermoplastic molding composition of claim 1, wherein the statistical butadiene/acrylonitrile copolymer contains 85 to 50% by weight butadiene and 15 to 50% by weight of acrylonitrile.

6. The thermoplastic molding composition of claim 1, wherein the statistical butadiene/acrylonitrile copolymer contains 82 to 52% by weight butadiene and 18 to 48% by weight of acrylonitrile.

7. The thermoplastic molding composition of claim 1, wherein the statistical butadiene/acrylonitrile copolymer contains about 34.9% by weight acrylonitrile and is hydrogenated to about 99.7%.

8. The thermoplastic molding composition of claim 1, wherein the nitrile rubber is at least 90% hydrogenated.

9. The thermoplastic molding composition of claim 1, wherein the nitrile rubber is at least 97% hydrogenated.

10. The thermoplastic molding composition of claim 1, wherein the polyether sulfone is the polycondensation product of bis-2,2-(hydroxyphenyl)-propane and bis-(4-chlorophenyl)-sulfone.

* * * * *